US006971820B2

(12) United States Patent
Rossabi et al.

(10) Patent No.: US 6,971,820 B2
(45) Date of Patent: Dec. 6, 2005

(54) MICROBLOWER ASSISTED BAROMETRIC VALVE

(75) Inventors: Joseph Rossabi, Aiken, SC (US);
Warren K. Hyde, Aiken, SC (US);
Brian D. Riha, Augusta, GA (US);
Dennis G. Jackson, Augusta, GA (US);
Frank Sappington, Augusta, GA (US)

(73) Assignee: Westinghouse Savannah River Company, Aiken, SC (US)

( * ) Notice: Subject to any disclaimer, the term of this patent is extended or adjusted under 35 U.S.C. 154(b) by 0 days.

(21) Appl. No.: 10/402,805

(22) Filed: Mar. 28, 2003

(65) Prior Publication Data

US 2004/0190994 A1   Sep. 30, 2004

(51) Int. Cl.[7] .............................................. B09B 1/00
(52) U.S. Cl. ........................... 405/128.15; 405/129.57; 454/900
(58) Field of Search ................. 405/128.15, 128.2, 405/128.25, 128.3, 128.7, 129.57; 454/900, 454/19

(56) References Cited

U.S. PATENT DOCUMENTS

| 4,057,933 | A |   | 11/1977 | Enyeart ........................ 47/79 |
|---|---|---|---|---|
| 4,850,745 | A |   | 7/1989 | Hater et al. ................. 405/258 |
| 5,114,497 | A |   | 5/1992 | Johnson et al. ............... 134/21 |
| 5,131,888 | A | * | 7/1992 | Adkins, II .................... 454/343 |
| 5,282,695 | A |   | 2/1994 | Crosby et al. .............. 405/128 |
| 5,368,092 | A |   | 11/1994 | Rearden et al. ............... 165/45 |
| 5,596,836 | A |   | 1/1997 | Benson ........................ 47/1.01 |
| 5,617,670 | A |   | 4/1997 | Benson ....................... 47/1.01 |
| 5,634,294 | A |   | 6/1997 | Rohoza .......................... 47/58 |
| 5,636,473 | A |   | 6/1997 | Benson .......................... 47/58 |
| 5,641,245 | A | * | 6/1997 | Pemberton et al. ....... 405/128.4 |
| 5,697,437 | A | * | 12/1997 | Weidner et al. ............... 166/52 |
| 5,893,680 | A | * | 4/1999 | Lowry et al. ............. 405/128.2 |
| 6,018,909 | A |   | 2/2000 | Potts .......................... 47/58.1 |
| 6,109,358 | A |   | 8/2000 | McPhee et al. ............. 166/401 |
| 6,121,040 | A |   | 9/2000 | Sakuranaga et al. ...... 435/262.5 |
| 6,220,830 | B1 |   | 4/2001 | Bzorgi ........................ 417/411 |
| 6,360,480 | B1 |   | 3/2002 | Christensen ................ 47/58.1 |
| 6,425,298 | B1 |   | 7/2002 | Jackson et al. .......... 73/863.73 |
| 6,428,694 | B1 |   | 8/2002 | Brown ........................ 210/170 |
| 2002/0067953 | A1 |   | 6/2002 | Ankeny et al. .......... 405/129.5 |
| 2003/0190883 | A1 | * | 10/2003 | Shockey ....................... 454/19 |

* cited by examiner

*Primary Examiner*—John Kreck
(74) *Attorney, Agent, or Firm*—J. Bennett Mullinax, LLC

(57) ABSTRACT

A gas exchange apparatus is provided which provides for both passive fluid flow and blower associated fluid flow through a barometric valve. A battery powered blower is provided which allows for operation of the barometric valve during times when the barometric valve would otherwise be closed, and provides for enhanced volume of gas exchange.

11 Claims, 5 Drawing Sheets

US 6,971,820 B2

MICROBLOWER ASSISTED BAROMETRIC VALVE

STATEMENT AS TO RIGHTS TO INVENTIONS MADE UNDER FEDERALLY SPONSORED RESEARCH AND DEVELOPMENT

The U.S. Government has rights in this invention pursuant to Contract No. DE-AC09-96SR18500 between Westinghouse Savannah River Company, LLC, and the U.S. Department of Energy.

FIELD OF THE INVENTION

This invention is directed towards a microblower which may be used in association with a passive barometric valve and remediation system to increase the volume of soil vapor extracted as well as the duration of time intervals during which a desired gas flow or exchange occurs. The microblower may be powered by a rechargeable battery system which is connected to a solar panel or wind turbine electrical generation system.

BACKGROUND OF THE INVENTION

This invention is directed to an apparatus and process for removing below ground vapors such as volatile organic compounds from subsurface regions. A variety of various devices and apparatuses is known for removing contaminants from the subsurface.

Among these are included apparatuses which require significant applications of energy to operate. Such apparatuses include U.S. Pat. Nos. 5,358,357; 5,172,764; 5,332,333; and 4,945,988 in which pumps are used to remove fluids from a subsurface.

The Applicant is the owner of U.S. Pat. No. 6,425,298 and U.S. Pat. No. 5,641,245 directed to a barometric responsive check valve for the passive control of an apparatus which provides for fluid communication between a subsurface zone and an above ground zone. As set forth in the commonly owned patents referenced above, one embodiment provides for an apparatus in which a valve opens when a well pressure is greater than an atmospheric pressure, allowing subsurface gaseous contaminants to be released into the atmosphere. When the well pressure is less than atmospheric pressure, the check valve will close to prevent the flow of atmosphere gas into the well.

While the above apparatuses have proven successful in providing for a low-cost passive removal of contaminants, there remains room for variation and improvement within the art.

SUMMARY OF THE INVENTION

It is one aspect of at least one of the present embodiments to provide an apparatus for fluid exchange between a subsurface region and a surface region comprising a housing having an inlet, the inlet adapted for engaging a riser pipe in communication with a well, a blower carried within the housing, a gas inlet of the blower in operative engagement with the housing inlet, and a barometric valve opening where a pressure on one side of the valve is greater than a pressure on the opposite side of the valve.

It is yet another aspect of at least one of the present embodiments to provide an apparatus for fluid exchange in which a blower is operated by a rechargeable battery powered by a solar cell or wind turbine.

It is yet another aspect of at least one of the present embodiments to provide for an apparatus for fluid exchange in which the apparatus provides for a housing inlet, a blower intake, and a barometric valve, all aligned along a common axis defined by the fluid exchange apparatus.

It is yet another aspect of at least one of the present embodiments to provide for an apparatus for exchanging fluids between a surface region and a subsurface region comprising a housing having a first opening adapted for operatively engaging a conduit positioned in part in a subsurface region; a barometric valve in fluid communication with a second opening defined within the housing, the valve opening when a pressure below the valve is greater than a pressure above the valve; and a blower carried within the housing, the blower supplying a pressure sufficient to open the valve, thereby establishing a gas flow pathway through the housing.

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DESCRIPTION OF THE PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus or process pathway. To avoid redundancy, detailed descriptions of much of the apparatus once described in relation to a figure are not repeated in the descriptions of subsequent figures, although such apparatus or process is labeled with the same reference numbers.

Figure 1:
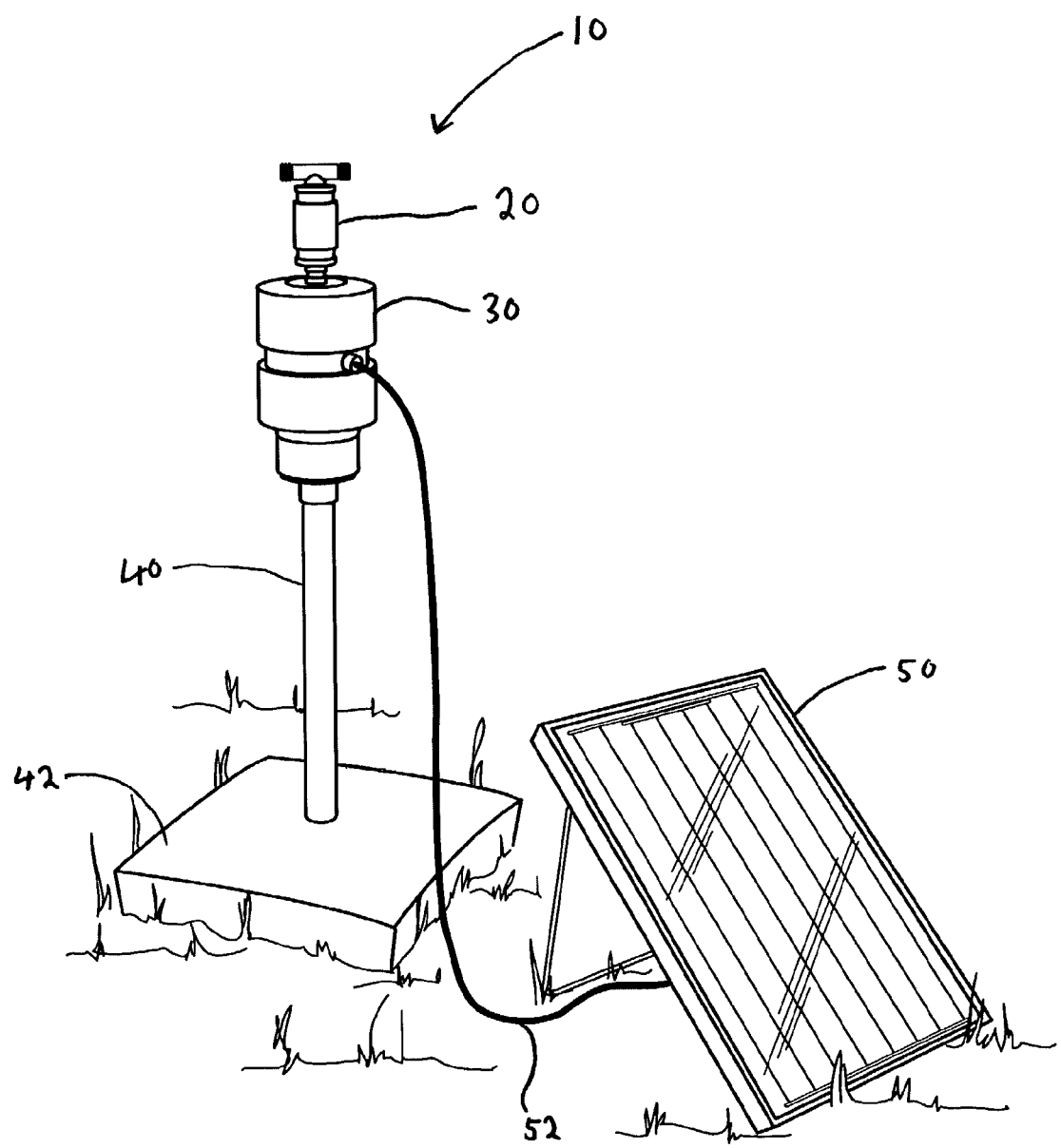
FIG. 1 is a perspective view of one embodiment of the fluid exchange apparatus.

As best seen in reference to FIG. 1, an apparatus 10 is provided which facilitates the exchange of fluids (gases) between a subsurface region and an above ground or surface region. The fluid exchange apparatus 10 is placed in operative engagement with a well riser pipe 40 which, in the illustrated example, extends above ground and is in further communication with a subsurface well (not shown). The riser pipe 40, which may be entirely below ground, extends to a point above a water table and further defines one or more perforated wall sections in a region associated with a high concentration of gaseous contaminants. Such gaseous contaminants are often present within a vadose zone of a subsurface contaminated region.

As is known in the art, a wellhead 42 may be provided which establishes a fluid tight seal around the riser pipe 40, thereby providing riser pipe 40 as the sole entry/exit point with respect to the underlying well. As seen in the illustrated embodiment of FIGS. 1 and 2, attached to an above ground terminus of riser pipe 40 is an air tight housing 30. Housing 30 may be constructed of polyvinyl chloride (PVC) pipe and provides for an inlet 32 which engages the riser pipe 40.

Figure 2:
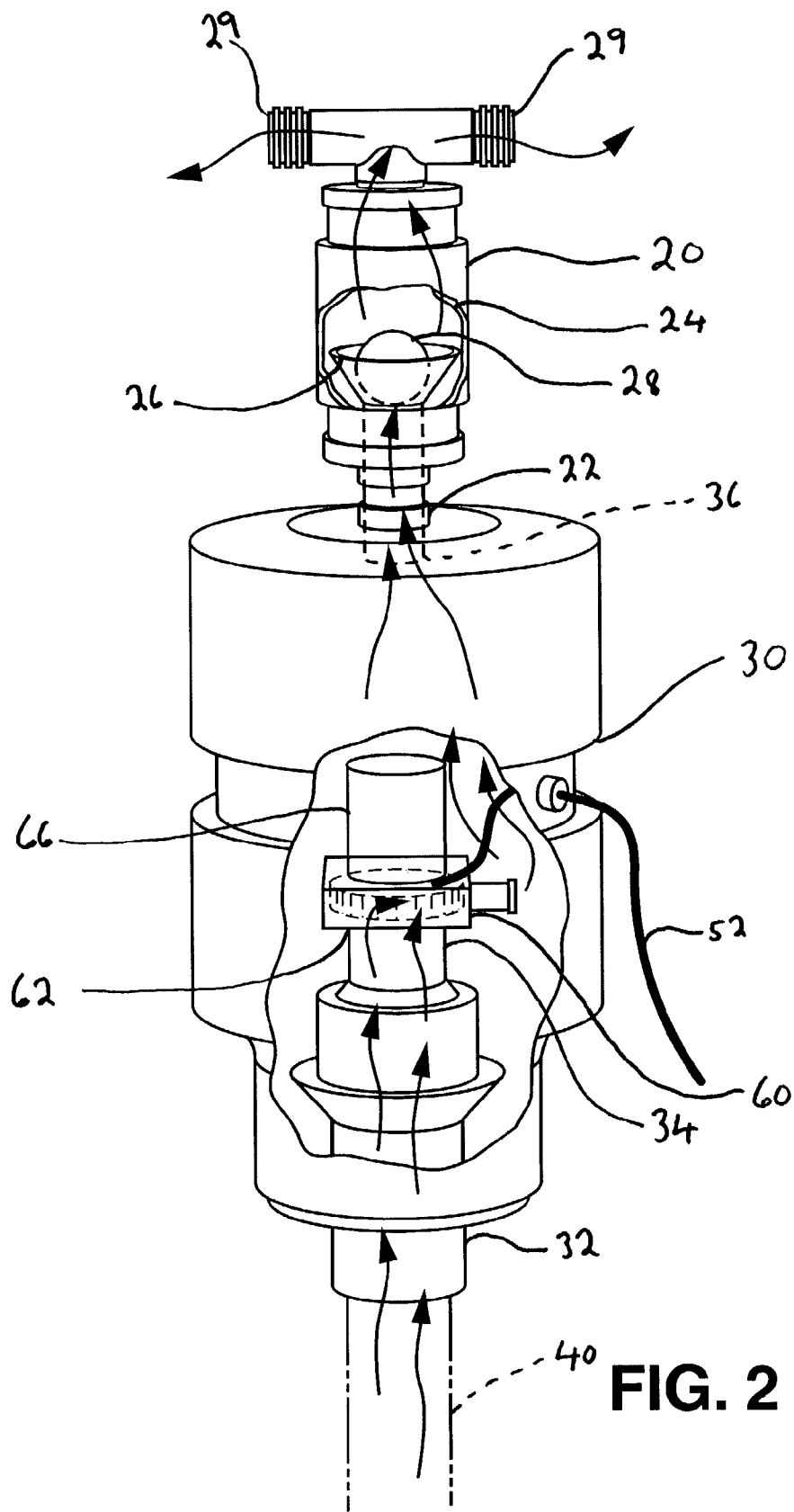
FIG. 2 is a perspective view in partial section setting forth a gas flow passageway and providing additional details of the construction of the apparatus.

As seen in reference to FIG. 2, a series of reducing couplers and bushings may be used to engage a larger diameter riser pipe 40 so as to provide a connection within the housing to a smaller diameter PVC pipe 34. Disposed within pipe 34 is a blower 60 and motor 66, seen here in the form of a rotary blower. As illustrated, blower 60 is provided with an inlet 62 which is in communication with pipe 34 and, in turn, riser pipe 40.

Blower 60 further provides an outlet 64 through which air/gas exits blower 60. Blower 60 may be provided by a 12 volt Microjammer™ Blower (Ametek Rotron, Saugerties, N.Y.) Model No. 119349-01 which provides for a gas flow volume through the blower of between about 10 to about 12 cubic feet per minute when supplied with about 1.5 amps at 12 volts. The blower described above is designed for use in respirators and has proven to be robust in design and exhibits a high degree of durability and reliability.

As seen in reference to FIG. 1, a solar panel 50 (Siemens Model ST 40) may be used to power the blower 60. If desired, a rechargeable battery (not illustrated) may also be provided, the battery being recharged through operation of the 40-watt solar panel 50. As seen in FIGS. 1 and 2, electrical lead 52 connects blower 60 to either the solar panel 50 or, alternatively, a suitable battery (not illustrated) which is, in turn, responsive to the solar panel 50 or a wind turbine.

As seen in reference to FIG. 2, gas flow, as indicated by the arrows, from blower 60 is directed into an upper half of housing 30, the gas flow exiting housing 30 through an outlet 36. Outlet 36 engages an inlet 22 of a barometric valve 20. The operation and construction of the barometric valve 20 is set forth in U.S. Pat. Nos. 5,641,245 and 6,425,298, owned by the current Applicant, and which are both incorporated herein by reference in their entirety for all purposes.

The barometric valve 20 defines a chamber 24 having a frustoconical valve seat 26 adapted for receiving a ball 28. Ball 28 may be provided by a table tennis ball which, when seated under a slight pressure differential generated by an upper pressure (such as atmospheric pressure) greater than a lower pressure (such as a well pressure), prevents gas flow from passing through the valve 20. When pressure from below the valve 20 is about 1 mbar greater than the atmospheric pressure, ball 28 is unseated, allowing the flow of gas through the valve 20. In the embodiment as seen in reference to FIGS. 1 and 2, the configuration of apparatus 10 permits gas flow from the well/riser pipe to be vented to the atmosphere through the barometric valve, exiting through valve outlet(s) 29.

While the illustrated embodiments provide for the barometric valve 20 to be positioned on an exterior of housing 30, it is within the scope of the present invention that the barometric valve 20 may be placed within the interior of housing 30 such that the barometric valve outlet(s) 29 is in further communication with the housing outlet 36. However, the illustrated embodiments have been found easier to construct and maintain under field conditions. The use of the blower assisted gas exchange apparatus enables a remediation project to be implemented which may require a fewer number of wells to be utilized when compared to a non-blower assisted barometric pump. Additionally, treatment times may be reduced through the increased volume and time duration of gas exchange made possible by the blower assisted gas exchange apparatus.

As set forth and described in reference to U.S. Pat. No. 5,641,245, the barometric valve 20 allows for passive gas exchange between a below ground region and an upper surface whenever barometric conditions provide a lower atmospheric pressure than a gaseous pressure present within the well/vadose zone. As such, a passive gas exchange may occur which requires no external energy input.

In accordance with the present invention, it has been found that the barometric valve and air exchange apparatus may be provided with an electric blower 60 which provides for an improved apparatus and process for venting gases and contaminants from a vadose zone or, alternatively, injecting surface gases into a vadose zone. In so doing, the described embodiments maintain the passive gas exchange capability during periods when the blower may be inoperative. The blower operation provides for an increased volume of gas to be removed from the subsurface and provides for an apparatus which is compact, easily erected and maintained in the field, and operates using a power source which is generated on site.

By positioning the blower 60 beneath the barometric valve 20, the operation of blower 60 establishes a sufficient pressure differential over the pressure on the opposite side of valve 20 such that ball 28 unseats and gas flow from inlet 22 of the barometric valve to the outlet(s) 29 is established. In a configuration where the housing inlet 32 is in communication with a vadose pressure, the gas flow as seen by directional arrows in FIG. 2 extends from the subsurface and exits the gas exchange apparatus 10 through housing outlet 36 and barometric valve outlet(s) 29. The blower assisted gas exchange is particularly useful for shallow vadose zones where naturally occurring pressure differentials between atmospheric pressure and a gaseous well pressure are more difficult to establish. The use of the blower provides for an efficient volume of gas flow without incurring high operation expenses or large capital investments in a gas exchange apparatus.

In accordance with this invention, it has been found that an electric blower provides for an effective displacement of a gas volume from a vadose zone when used in combination with a barometrically controlled venting operation. Large volume air blowers or fans are not cost effective since the energy cost associated with moving large volumes of gas from the subsurface quickly exceeds the cost benefit of the additional gas flow. The amount of contaminated gases which is released into a vadose zone is controlled by diffusion and absorption characteristics of the subsurface. As a result, high volume, high energy gas exchange apparatuses bring about a diminishing return for the energy investment since the volume of removed gas can easily exceed the contaminant diffusion/absorption release rate. In the present invention, the 10 to 12 cubic feet per minute of gas flow provided by the solar powered blower provides for a volume of gas removal which better approximates the release rate of subsurface gaseous contaminants within a single wellhead.

Figure 5:
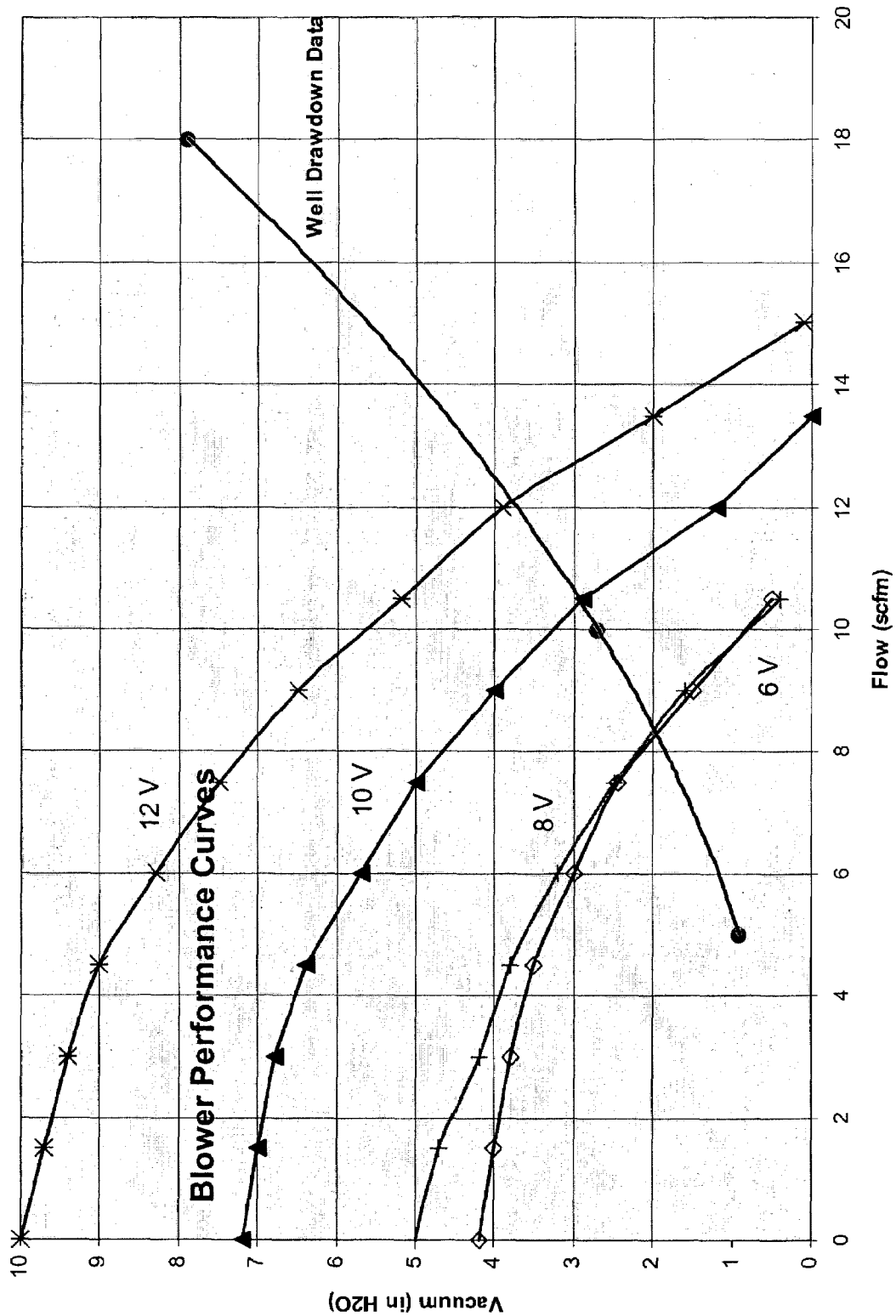
FIG. 5 is a graph indicating blower performance curves in relation to well drawdown data and which indicates optimal blower characteristics with respect to well vapor properties.

As best seen in reference to FIG. 5, the selection of an appropriate blower and operating voltage may be seen in reference to the point of intersection of a blower performance curve relative to well drawdown data. The plotted well drawdown data reflects the permeability of the vadose zone which varies depending upon the type of soil, the compactness of the soil, and the moisture of the soil. As seen in reference to FIG. 5, with respect to the well drawdown data provided, a blower motor operated at 12 volts may provide for a flow rate of about 12 cubic feet per minute and may provide a vacuum pressure of about 4 inches of water. In the example cited, the gas flow rate from the well to the above ground surface is between 2 to 3 times greater than a typical passive barometric pumping rate.

During intervals when the blower is inoperative, such as through lack of adequate solar energy, the passive venting capabilities of the gas exchange apparatus can continue. The additional gas flow volume provided by operation of the blower increases the volume of removed gaseous contaminants and does so using a system which generates its own supplemental energy needs. Accordingly, the gas exchange apparatus described herein is well suited for use in remote locations where electrical utilities may be unavailable. Further, the present invention is useful in treating contaminated sites where either contaminant levels or economic conditions are such that a longer duration passive/low volume blower assisted gas exchange is desirable over more expensive, higher volume gas extraction technologies.

The apparatus 10 can also be configured to "inject" heat and gases into a subsurface to assist in bioremediation of a subsurface. As best seen in reference to commonly owned U.S. Pat. No. 5,641,245, the top end of riser pipe 40 may be fitted with an elbow connection which is attached to the upper end of barometric valve 20 along outlet(s) 29. In this configuration, the ball 28 will unseat when atmospheric pressure is greater than well pressure and will, accordingly, be closed when atmospheric pressure is less than well pressure. Blower 60 is now positioned to direct atmospheric gases from inlet 32, through the housing 30 and barometric valve 20 and into the subsurface region. Thus, during periods of high atmospheric pressure (relative to the vadose pressure), air/gas from the atmosphere passes through the housing and barometric valve and enters riser pipe 40 and is passively injected into well 18. During periods of low atmospheric pressure, the valve is closed and contaminants are contained within the well. The operation of blower 60 allows for the injection of additional surface gas during periods of low atmospheric pressure as well as increasing the volume of injected gas during times when atmospheric pressure is greater than the well pressure.

This configuration is useful for bioremediation processes which introduce ambient gases into a below ground region. The ambient gases serve as a source of heat and oxygen for naturally occurring or exogenous microorganisms present within the vadose zone. The addition of gas and heat along with the mass flow movement of contaminants in response to the introduced gases, are all beneficial to the bioremediation process. As such, the apparatus lends itself for use in bioremediation processes. While the injected gas is frequently air, the apparatus 10 also facilitates the injection of other supply gases such as nitrogen.

Once adequate gases are introduced to the below ground region, the barometric valve prevents the escape of either the contaminants or the introduced gases, thereby maximizing the efficiency of the underlying bioremediation pathway. It is also understood and appreciated by one having ordinary skill in the art, that the air exchange apparatus of the present invention may have the air inlet or air outlets selectively capped off when desired so as to prevent any additional introduction or release of gases to or from the subsurface region.

The present invention also provides for an apparatus and process for treating soil, and in particular soil associated with turf grasses such as those used on golf courses or athletic fields. As seen in reference to FIGS. 3 and 4, a top layer of soil 111 supports the turf forming the putting surface of a golf green or other athletic turf surface. The top layer of soil contains a mixture of sand and organic matter placed above an intermediate layer of a coarser sand which, in turn, is placed above a bed of drainage gravel. As best seen in reference to FIG. 4, beneath the gravel bed is a drain system that includes a network 115. The drainage system includes a central distribution line 116 from which a series of feeder lines 117 extends beneath the turf. As is well known in the art, lines 116 and 117 are perforated and placed along a gravel bed so that excess moisture is collected in the lines. The lines are laid such that collected moisture is gravity fed into a drain line 120 which, in turn, carries the moisture to a main drainage system. If desired, an optional cleanout line 122 is located along one end of the distribution line that permits the drainage network to be flushed using high pressure water. A shutoff valve 125 may be connected to the cleanout line for closing off the upper end of the drainage network 115.

The lower end of the distribution line is equipped with a two-way valve 130 having a disconnect fitting 131 at one end of the valve outlet. The other outlet of the valve 130 is connected to drain line 120. Downstream from the connection is a shutoff valve 133 mounted in the drain line that permits the drain line to be opened or closed. A connection 140 is schematically illustrated showing a connection between the fluid exchange apparatus 10 and the drainage system 115.

Figure 3:
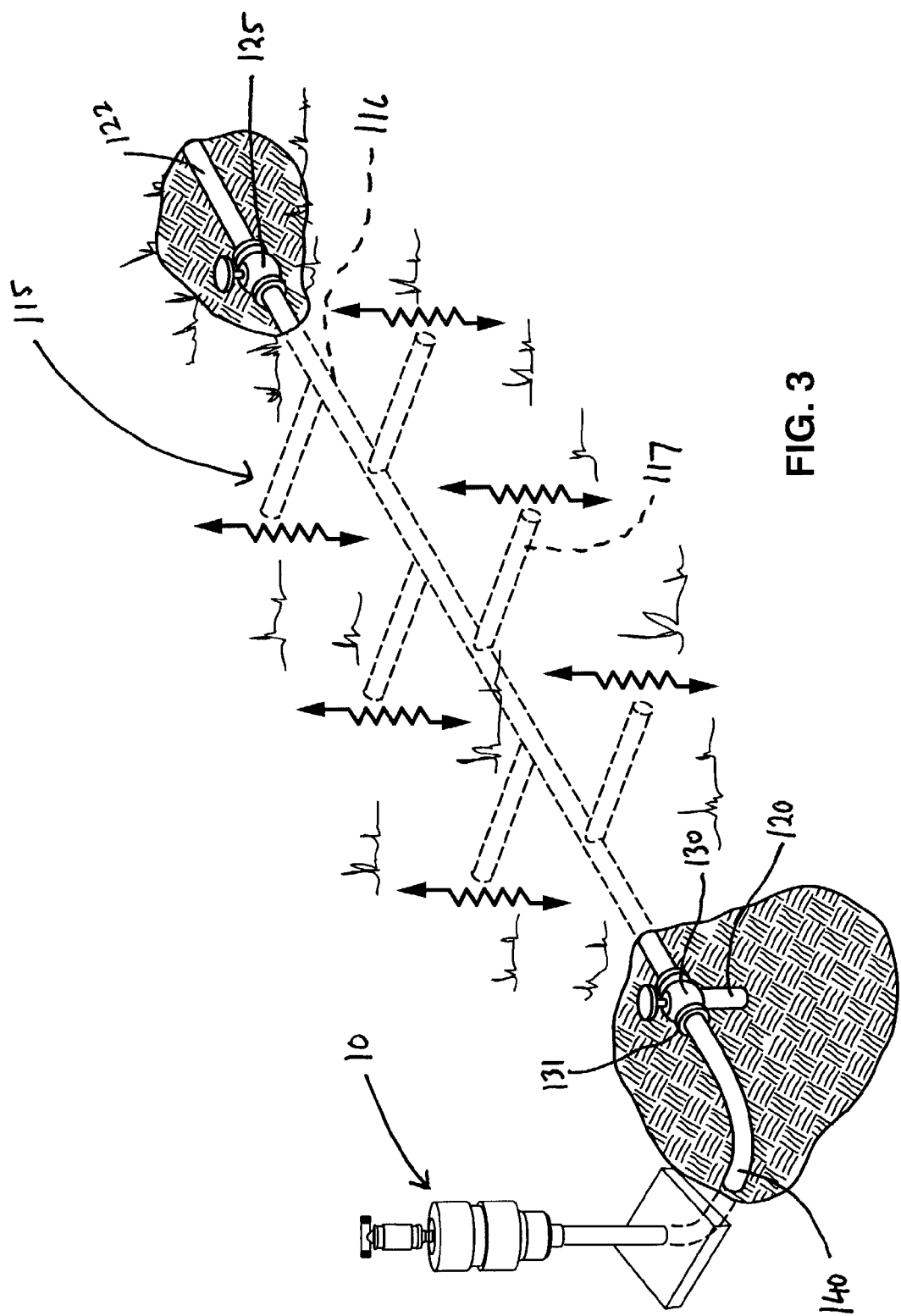
FIGS. 3 and 4 are schematic views of the fluid exchange apparatus when used in conjunction with a turf management drying/heat exchange system.
Figure 4:
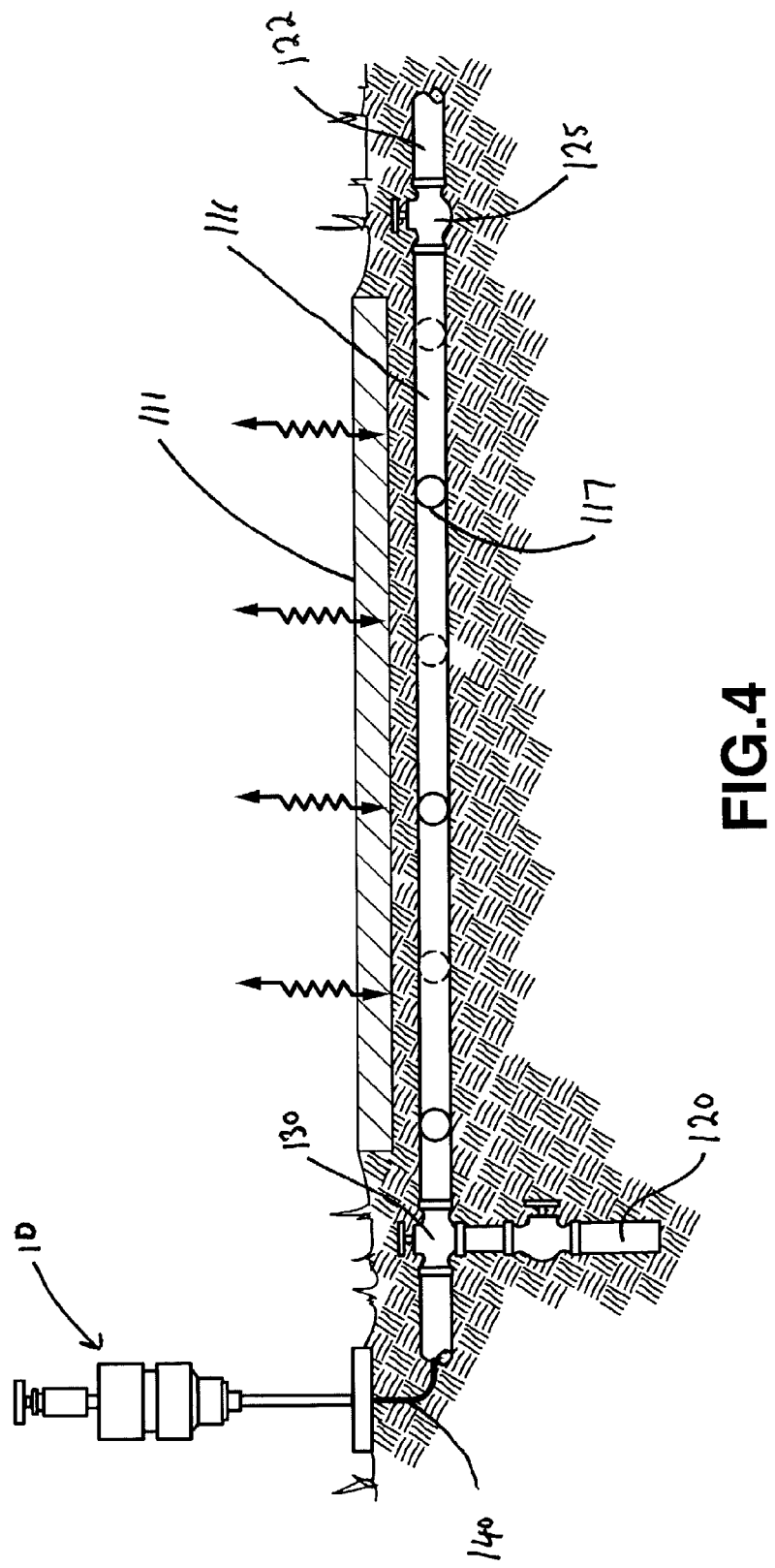

In the configuration seen in reference to FIGS. 3 and 4, the blower assisted fluid exchange apparatus 10 causes ambient air to be drawn downwardly through the turf. Any excess moisture in the soil will be pulled into the duct lines and delivered into the drain line 120 increasing the drainage efficiency of the network. This arrangement is suitable for varying the ambient temperature of the soil/turf and may be used to achieve a desired cooling or a warming of the turf. The directional gas flow also allows for the drawdown of pesticide vapors or other chemical treatments to remove them from the user surface.

When the gas exchange apparatus 10 and subsurface connection are configured for injection (not illustrated) as described above, ambient surface gas (air) is delivered into the duct network along connection 140. The air is passed through the lines of the duct work and uniformly distributed throughout the gravel bed positioned beneath the turf. The supplied pressurized air may be directed upwardly through the soil and subsoil of the turf back into the surrounding ambient surface. Gas moving upwardly through the turf can be used to aerate the soil as well as to heat or cool the soil. The bi-directional arrows in FIGS. 3 and 4 indicate the ability of the apparatus to control the gas flow in different directions.

The embodiments of the invention as seen in reference to FIGS. 3 and 4 are ideally suited for turf management of golf courses including putting greens. The gas exchange apparatus 10, along with the solar panel 50, (not illustrated in FIGS. 3 and 4) is sufficiently portable that the gas exchange apparatus may be installed only when needed or permanently positioned a sufficient distance away from the turf so as to be unobtrusive. The gas exchange apparatus and combined drainage/cooling/heating system properties allow the controlled management of a turf environment, particularly in places where permanent electrical utilities are not available or cost effective to install. In this manner, the microblower assisted ventilation apparatus may be used to bring about the desired cooling or heating of turf grasses along with promoting appropriate moisture control of the turf.

As such, the gas exchange apparatus of the present invention may be used to replace blower systems in a variety of soil treatment apparatuses. Such apparatuses include soil treatment units as set forth in U.S. Pat. Nos. 5,617,670; 4,050,933 4,850,745; 5,596,836; 5,634,294; 5,636,473; and 5,893,680 which are all incorporated herein by reference in their entirety and for all purposes.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

The embodiments of the invention as seen in reference to FIGS. 3 and 4 are ideally suited for turf management of golf courses including putting greens. The gas exchange apparatus 10, along with the solar panel 50, (not illustrated in FIGS. 3 and 4) is sufficiently portable that the gas exchange apparatus may be installed only when needed or permanently positioned a sufficient distance away from the turf so as to be unobtrusive. The gas exchange apparatus and combined drainage/cooling/heating system properties allow the controlled management of a turf environment, particularly in places where permanent electrical utilities are not available or cost effective to install. In this manner, the microblower assisted ventilation apparatus may be used to bring about the desired cooling or heating of turf grasses along with promoting appropriate moisture control of the turf.

As such, the gas exchange apparatus of the present invention may be used to replace blower systems in a variety of soil treatment apparatuses. Such apparatuses include soil treatment units as set forth in U.S. Pat. Nos. 5,617,670; 4,050,933 4,850,745; 5,596,836; 5,634,294; 5,636,473; and 5,893,680 which are all incorporated herein by reference in their entirety and for all purposes.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed is:

1. An apparatus for exchanging gases between a subsurface region and a surface region comprising:
    a housing having an inlet and an outlet, said inlet adapted for engaging a well riser pipe;
    a centrifugal blower having an intake and an outlet carried within said housing, the intake of said centrifugal blower in operative engagement with said housing inlet; and,
    a barometric valve in communication with said housing, said valve opening when a pressure below said valve is greater than a pressure above said valve, said housing, said centrifugal blower, and said barometric valve are configured to deliver a flow rate which approximates a contaminant diffusion rate of the subsurface.

2. The apparatus according to claim 1 wherein said centrifugal blower is powered by a solar cell.

3. The apparatus according to claim 1 wherein said barometric valve extends from an upper half of said housing.

4. The apparatus according to claim 1 wherein said housing is constructed of polyvinyl chloride pipe.

5. An apparatus for exchanging gases between a subsurface region and a surface region comprising:
    a housing having a first opening and a second opening, one of said first and said second openings adapted for operatively engaging a conduit positioned at least in part in a subsurface region;
    a barometric valve in fluid communication with said housing, said valve opening when a pressure on a first side of said valve is greater than a pressure on a second side of said valve; and
    a centrifugal blower having an intake and an outlet carried within said housing, said centrifugal blower supplying a pressure sufficient to open said valve, thereby establishing a gas flow through said apparatus which provides for gas flow between a surface region and a subsurface region, said centrifugal blower, said barometric valve, and said first opening and said second opening of said housing being in alignment along a common axis and are further configured to provide a blower assisted air flow which approximates at least one of a diffusion rate or an absorption rate of a gas relative to the subsurface.

6. The apparatus according to claim 5 wherein said centrifugal blower is positioned below said barometric valve.

7. The apparatus according to claim 5 wherein said centrifugal blower is operated by a battery, said battery being further connected to a solar panel.

8. The apparatus according to claim 5 wherein said centrifugal blower directs a gas from a surface region through said barometric valve and said gas is released into a subsurface region.

9. The apparatus according to claim 5 wherein said centrifugal blower directs a subsurface gas through said barometric valve and said gas is released into a surface region.

10. The apparatus according to claim 1 wherein said centrifugal blower generates a flow rate of between about 10 cfm to about 12 cfm.

11. The apparatus according to claim 5 wherein said centrifugal blower generates a flow rate of between about 10 cfm to about 12 cfm.

* * * * *